(No Model.)

E. W. COOKE.
ROLLER BEARING.

No. 442,356. Patented Dec. 9, 1890.

Witnesses:

Inventor:
Ernest W. Cooke
by
Haupt Brothers.
ATTORNEY.

UNITED STATES PATENT OFFICE.

ERNEST WM. COOKE, OF CHICAGO, ILLINOIS, ASSIGNOR TO THE AMERICAN ROLLER BEARING COMPANY, OF SAME PLACE.

ROLLER-BEARING.

SPECIFICATION forming part of Letters Patent No. 442,356, dated December 9, 1890.

Application filed January 27, 1890. Serial No. 338,306. (No model.)

*To all whom it may concern:*

Be it known that I, ERNEST WILLIAM COOKE, a citizen of the United States, residing at Chicago, in the county of Cook and State of Illinois, have invented a new and useful Improvement in Cages for Roller-Bearings, of which the following is a specification.

My invention relates to cages for roller-bearings in which rings united by rods are made to support a series of rollers held between the said rings by metallic balls, one in each end of each roller, the said rings being in sections. One of the rings is provided with a take-up, which enables the rollers to conform themselves to the varying diameters of the shafts or axles.

My object is to provide a ready means for removing the roller-bearing from about the axle or shaft, and, further, to provide a means to take up any slack that may occur in the ends of the rollers. I attain these objects by means of the mechanism shown in the accompanying drawings, in which—

Figure 1:
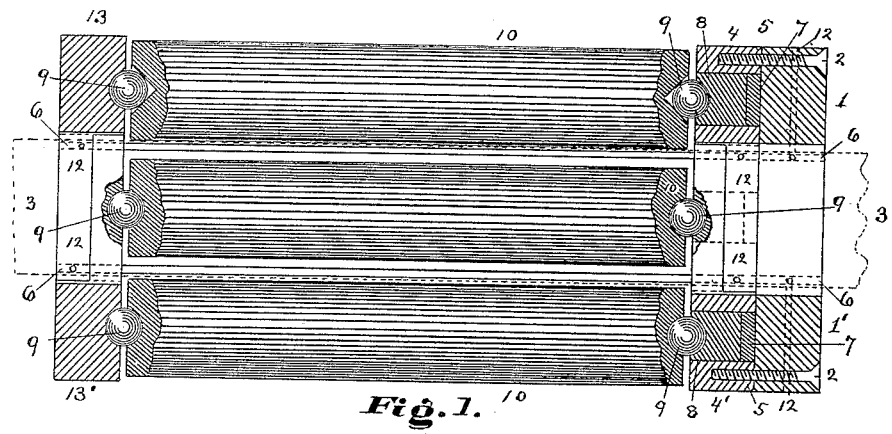
Figure 2:
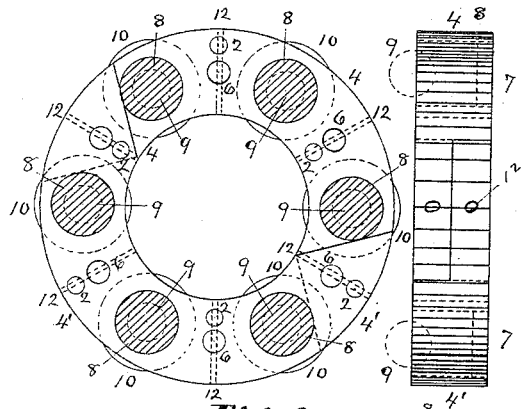
Figure 3:
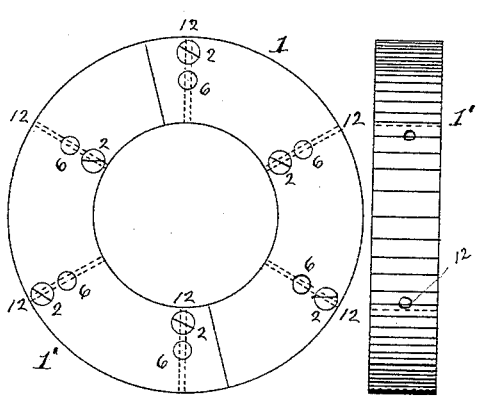

Figure 1 is a vertical section of the cage for roller-bearing in the median line. Fig. 2 is an end view and a side view of the ring 4. Fig. 3 is an end view and a side view of the ring 1.

Similar figures refer to similar parts throughout the several views.

I use a cylindrical ring, which is composed of two halves 13 and 13'. These halves are mortised at the ends, so that one half will fit into and lock with the other half, and the line of union of the two halves is at an angle with the circumference of the ring. On the inner face of the two inner rings is a series of concave pits, each pit carrying a metallic ball, which act as pivots for the rollers 10 to revolve on. The rollers 10 are made of metal of the required size and length to revolve on the balls between the two rings 13 and 13' and 4 and 4'. In each end of the rollers 10 is a pit to accommodate the balls 9, which balls 9 act as pivots for the rollers they revolve on. At the ends of the rollers 10, remote from the ring 13 and 13', I place a ring 4 and 4' of similar construction to the ring 13 and 13', with the exception of having holes drilled through the ring 4 and 4' to correspond with the concave pits in the ring 13 and 13'. In the holes of ring 4 and 4' I place plugs 8, which have concave pits on the end nearest the rollers to accommodate the balls 9. These plugs 8 do not fill the holes in the ring 4 and 4', and at the end of each plug I place in each hole a washer 7. Back of the washer 7 and on the outside of the ring 4 and 4' I place a ring 1 and 1'. This ring 1 and 1' is held against ring 4 and 4' and also against the washers 7 by the screws 2, stay-bolts 6, and pins 12. Said ring 1 1' is cut into two segments, and these segments are placed against ring 4 and 4', so that the dividing point does not come opposite the dividing point of ring 4 and 4'. The rings 1 and 1', 4 and 4', and 13 and 13' are secured together to form a cage by the stay-bolts 6, which run through the rings and into them, and are secured by the pins 12, passing through said stay-bolts. Between the ring 4 and 4' and the ring 13 and 13' are placed the rollers 10, which revolve on the balls 9. These rollers 10 are allowed to expand or contract laterally by means of the adjusting-plugs 8 and washers 7, which allow of the cage to fit shafts or axles of varying diameter.

Having thus described the parts of my invention, I proceed to explain the manner of operating the same. I place the ring 13 and 13' in position. I then lay balls 9 into the concave pits. The stay-bolts 6 are then placed through the ring 13 and 13'. The rollers 10 are then placed with their concave ends on the balls 9. I then place the balls 9 for the opposite ends of the rollers into the concave pits of the rollers. I then place ring 4 and 4' together and put in the plugs 8. This ring 4 and 4' is then placed over the stay-bolts 6 into position and pins 12 adjusted. I then place the cage for roller-bearing onto the shaft or axle upon which it is intended to be used and adjust the plugs 8 so that there is no horizontal play of the rollers. I then fill the space 7 with a washer, which is flush with the outside of the ring 4 and 4'. The ring 1 and 1' is then placed against ring 4 and 4' and secured by the screws 2 and the pins 12, which pass through the stay-bolts 6. This cage is made so that it can be removed easily from an axle or shaft by simply taking off the ring 1 and 1' and taking out the two stay-bolts 6, which go through the interlocking segments on each side of the ring. If the rollers become loose, I can take up the slack by simply taking off the rings 1 and 1' and inserting thicker washers into the cavities 7.

I am aware that cages for roller-bearings have been used, and I do not, therefore, claim roller-bearings in a broad sense; but What I do claim, and desire to secure by Letters Patent, is—

1. In a cage for roller-bearings, the combination of rings made in segments interlocking one with the other, and balls supporting the ends of rollers, all substantially as and for the purpose set forth and described.

2. In a roller-bearing in which balls support the rollers, a cage formed of two main rings, one of which is provided with holes for adjusting plugs and washers, a third ring bearing against said last-mentioned ring, and means for securing the cage together, all substantially as and for the purpose set forth and described.

3. In a roller-bearing in which balls support the rollers, two segmental rings provided with interlocking portions, and one of them with plugs, and washers seated in recesses therein, and a third ring secured to the last-mentioned ring, all substantially as and for the purpose set forth and described.

ERNEST WM. COOKE.

In presence of—
T. E. SHEEBE,
T. MCALLISTER.